(12) United States Patent
Webb

(10) Patent No.: US 9,801,033 B1
(45) Date of Patent: Oct. 24, 2017

(54) FAMILY MEMBER TRACKING

(71) Applicant: Vivint, Inc., Provo, UT (US)

(72) Inventor: Adam K. Webb, Provo, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/094,157

(22) Filed: Apr. 8, 2016

(51) Int. Cl.
*H04W 4/04* (2009.01)
*H04W 4/12* (2009.01)
*H04W 4/02* (2009.01)

(52) U.S. Cl.
CPC .............. *H04W 4/12* (2013.01); *H04W 4/021* (2013.01); *H04W 4/028* (2013.01); *H04W 4/04* (2013.01)

(58) Field of Classification Search
CPC .................................. H04W 4/04; H04W 4/12
See application file for complete search history.

(56) References Cited

U.S. PATENT DOCUMENTS

| | | | | |
|---|---|---|---|---|
| 6,718,176 B2 * | 4/2004 | Michaud | ............... | H04W 88/02 455/456.1 |
| 7,039,427 B2 * | 5/2006 | Tachikawa | .............. | H04W 4/02 455/404.2 |
| 7,177,651 B1 * | 2/2007 | Almassy | ............... | G01S 5/0072 340/994 |
| 7,647,164 B2 * | 1/2010 | Reeves | ................... | H04L 67/16 455/404.2 |
| 8,350,700 B2 | 1/2013 | Fast et al. | | |
| 8,531,294 B2 * | 9/2013 | Slavin | ................ | G08B 13/2402 340/539.13 |
| 2003/0073440 A1 * | 4/2003 | Mukherjee | .............. | H04L 12/58 455/435.1 |
| 2003/0100294 A1 * | 5/2003 | Hosono | ................. | H04L 63/083 455/414.1 |
| 2003/0194993 A1 * | 10/2003 | Fomukong | ......... | H04B 7/18567 455/414.1 |
| 2003/0211853 A1 * | 11/2003 | Banno | ................... | G01S 5/0072 455/456.6 |
| 2004/0132465 A1 * | 7/2004 | Mattila | .................. | G11B 5/455 455/456.1 |
| 2004/0166879 A1 * | 8/2004 | Meadows | ............... | H04W 4/02 455/456.1 |
| 2004/0198398 A1 * | 10/2004 | Amir | ....................... | H04W 4/02 455/456.6 |
| 2004/0203903 A1 * | 10/2004 | Wilson | .................. | H04W 64/00 455/456.1 |
| 2005/0202830 A1 * | 9/2005 | Sudit | ..................... | H04W 4/028 455/456.1 |
| 2005/0251326 A1 * | 11/2005 | Reeves | ................... | H04L 67/16 701/519 |

(Continued)

*Primary Examiner* — Christopher M Brandt
(74) *Attorney, Agent, or Firm* — Holland & Hart LLP

(57) ABSTRACT

A method for security/automation systems is described. In one embodiment, the method may include receiving, at an automation system, an instruction from a first user, the instruction including a request for a location of one or more second users; analyzing, at the automation system, one or more location parameters associated with the automation system based at least in part on the request; determining, at the automation system, the location of the one or more second users based at least in part on the analyzed one or more location parameters; and communicating, from the automation system, the location of the one or more second users to the first user based at least in part on the determining.

20 Claims, 7 Drawing Sheets

(56) References Cited

U.S. PATENT DOCUMENTS

| | | | |
|---|---|---|---|
| 2006/0030339 A1* | 2/2006 | Zhovnirovsky | H04W 4/02 455/456.6 |
| 2006/0183486 A1* | 8/2006 | Mullen | H04W 8/14 455/456.1 |
| 2008/0186162 A1* | 8/2008 | Rajan | G06F 21/88 340/539.13 |
| 2009/0197612 A1* | 8/2009 | Kiiskinen | H04W 64/00 455/456.1 |
| 2010/0289644 A1* | 11/2010 | Slavin | G08B 13/2402 340/568.1 |
| 2011/0148626 A1 | 6/2011 | Acevedo | |
| 2012/0161971 A1* | 6/2012 | Nasir | G07C 1/10 340/573.4 |
| 2014/0059695 A1 | 2/2014 | Parecki et al. | |
| 2014/0323079 A1 | 10/2014 | Paolini | |
| 2016/0157074 A1* | 6/2016 | Joao | G01C 21/34 455/404.2 |
| 2016/0183037 A1* | 6/2016 | Grohman | H04W 4/008 709/221 |

* cited by examiner

FAMILY MEMBER TRACKING

BACKGROUND

The present disclosure, for example, relates to home security and/or automation systems, and more particularly to providing systems and methods for tracking a location of a user.

Home security and automation systems are widely deployed to provide various types of communication and functional features such as monitoring, communication, notification, and/or others. These systems may be capable of supporting communication with an user through a communication connection or a system management action.

Home security and automation systems may allow users to track a location of a device and/or a user carrying the device. Such geo-location information, however, is not always readily available. As a result, benefits may be realized by providing techniques for tracking a location of a user, especially a child, associated with the home security and/or automation system. Typically, parents may not be continuously aware of their child's location within or outside the home. However, parents may be limited in methods of tracking a location of their child. For example, a parent searching for his child in his home may be limited to calling the child's cellular phone, if the child has one, or using an intercom system in the home. The latter method may be limiting, however, in instances where the child may not be able to hear the intercom, or may be located outside the home. These methods of tracking a location of the child within the home may therefore be incomplete and inefficient. It may therefore be desirable to provide a method by which users may be located both within and outside of the home, with particularity.

SUMMARY

A parent may want to acquire respective locations for one or more children via his home security and/or automation system. In one example, the home security and/or automation system may communicate with a device that recognizes user input (e.g., user inputted or spoken commands) and initiates operations relating to the home security and/or automation system for tracking a location of a child. In some cases, a parent may input a request at a control panel of the home security and/or automation system for tracking the location of the child. In other examples, the parent may transmit a request using an application on a mobile device that communicates directly with a control panel and/or one or more other devices of the home security and/or automation system. Once the parent transmits a request to track the location of his child, the home security and/or automation system may perform one of several operations.

Accordingly, the present disclosure provides a method for security/automation systems which may include receiving, at an automation system, an instruction from a first user, the instruction comprising a request for a location of one or more second users; analyzing, at the automation system, one or more location parameters associated with the automation system based at least in part on the request; determining, at the automation system, the location of the one or more second users based at least in part on the analyzed one or more location parameters; and communicating, from the automation system, the location of the one or more second users to the first user based at least in part on the determining. In some cases, the instruction from the first user is received at a control panel associated with the automation system.

In one embodiment, analyzing one or more location parameters associated with the automation system may include receiving occupancy data from one or more sensors associated with the automation system. In some embodiments, the method may further include collecting identity data from the one or more sensors, comparing the collected identity data to one or more identities from an identity database associated with the automation system, identifying the one or more second user based at least in part on the comparing, and communicating, from the automation system, the identity and the location of each of the one or more second users.

In one embodiment, analyzing one or more location parameters associated with the automation system may include receiving, at the automation system, schedule information associated with the one or more second users; deriving a predicted location of the one or more second users based at least in part on the received schedule information; and communicating, from the automation system, the predicted location of the one or more second users to the first user. In some cases, receiving the schedule information associated with the one or more second users may include determining that the one or more second users are outside a geo-fence perimeter based at least in part on the analyzed one or more location parameters.

In some embodiments, the method may include receiving a location of the one or more second users from a mobile device associated with the one or more second users; detecting that the location received from the mobile device associated with the one or more second users is different from the predicted location derived from the received schedule information; and communicating a message to the first user indicating a difference between the location of the mobile device associated with the one or more second users and the predicted location derived from the received schedule information. In some embodiments, detecting that the location received from the mobile device associated with the one or more second users is different from the predicted location derived from the received schedule information may include tracking the location of the one or more second users based at least in part on requesting an update in the location of the one or more second user during a predetermined time interval from the mobile device associated with the one or more second users; and communicating an updated message to the first user based at least in part on the tracked location of the one or more second users.

In one embodiment, analyzing one or more location parameters associated with the automation system may include requesting a location from a mobile device associated with the one or more second users; receiving the location from the mobile device associated with the one or more second users; and communicating the location associated with the one or more second users to the first user.

The present disclosure may also relate to an apparatus for security and/or automation systems. In some embodiments, the apparatus may include a processor and memory in electronic communication with the processor, instructions stored in the memory, the instructions being executable by the processor to receive an instruction from a first user, the instruction comprising a request for a location of one or more second users; analyze one or more location parameters associated with the automation system based at least in part on the request; determine the location of the one or more second users based at least in part on the analyzed one or more location parameters; and communicate the location of the one or more second users to the first user based at least in part on the determining.

The present disclosure may also relate to computer-program product. In some embodiments, the computer-program product may include a non-transitory computer-readable medium storing instructions thereon, the instructions being executable by a processor to receive an instruction from a first user, the instruction comprising a request for a location of one or more second users; analyze one or more location parameters associated with the automation system based at least in part on the request; determine the location of the one or more second users based at least in part on the analyzed one or more location parameters; and communicate the location of the one or more second users to the first user based at least in part on the determining.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The techniques described herein relate to home security and/or automation systems. More specifically, the techniques described herein relate to using the home security and/or automation system for tracking a location of a user, particularly a child. A home security and/or automation system may receive at least one instruction from a first user requesting a location of one or more second user. For instance, a parent in a home may want to acquire respective locations for one or more children inside or outside the home.

In some embodiments, the home security and/or automation system may communicate with a device that recognizes user input and initiates operations relating to the home security and/or automation system for tracking a location of a child. For instance, a parent may input a request at a control panel of the home security and/or automation system for tracking the location of the child. In other examples, the parent may transmit a request using an application on a mobile device that communicates directly with a control panel and/or one or more other devices associated with the home security and/or automation system. In alternate embodiments, the home security and/or automation system, control panel, and/or the voice-activated device may communicate with a security system and/or another automation device (e.g., sensors) within the home for determining a location of the child. The home security and/or automation system may analyze one or more location parameters associated with the home security and/or automation system for determining the location of the child.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
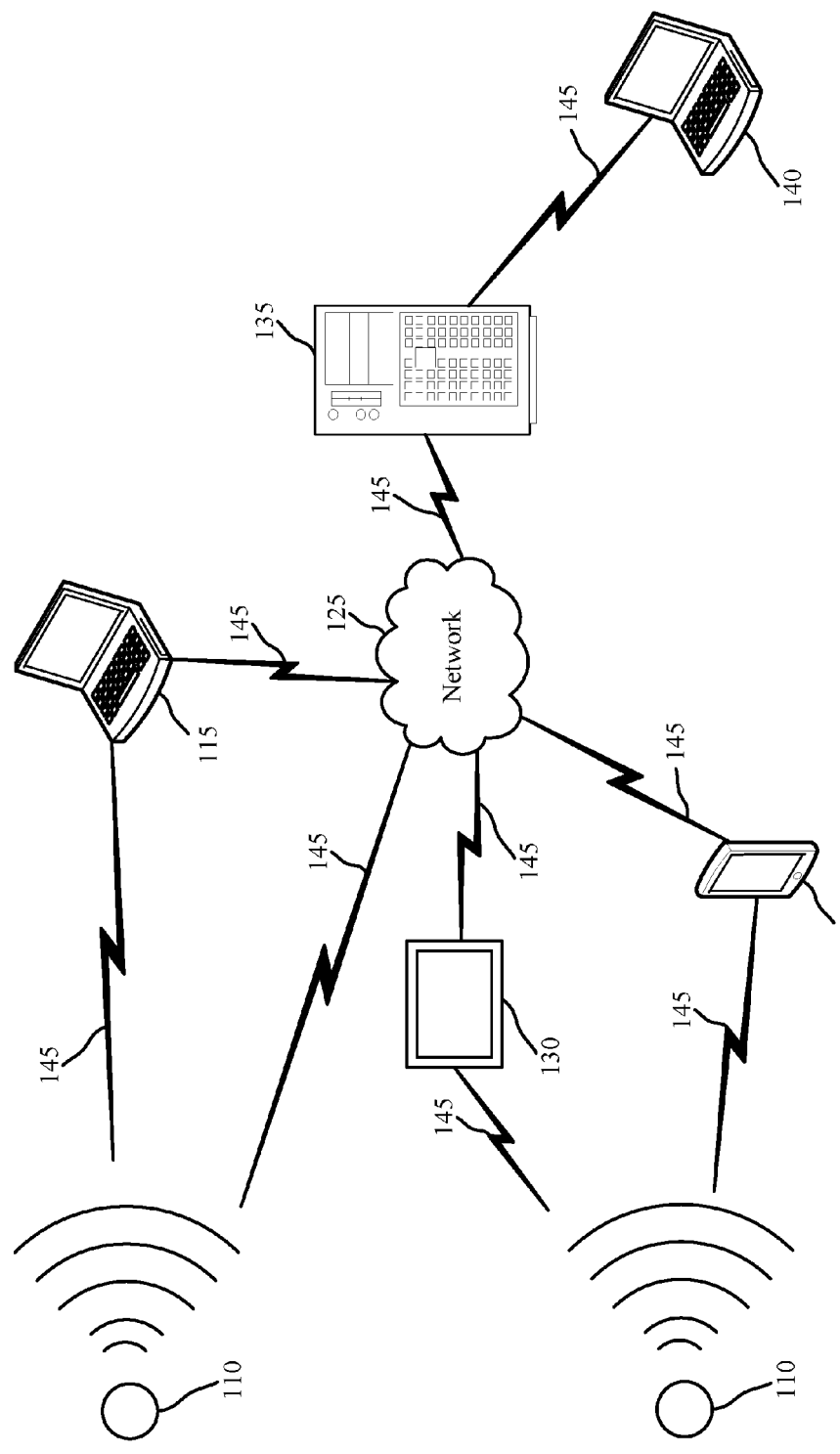
FIG. 1 shows a block diagram relating to an example of a home security and/or automation system, in accordance with various aspects of this disclosure.

FIG. 1 is an example of a home security and/or automation system 100 in accordance with various aspects of this disclosure. In some embodiments, the home security and/or automation system 100 may include the one or more sensor units 110, local computing device 115, 120, a network 125, a control panel 130, a server 135, and a remote computing device 140. The one or more sensor units 110 may communicate via wired or wireless communication links 145 with one or more of the local computing devices 115, 120, the control panel 130, and/or the network 125. The network 125 may communicate via wired or wireless communication links 145 with the control panel 130 and the remote computing device 140 via server 135. In alternate embodiments, the network 125 may be integrated with any one of the local computing device 115, 120, the server 135, and/or the remote computing device 140, such that separate components may not be required.

The local computing device 115, 120, and the remote computing device 140 may be custom computing entities configured to interact with the one or more sensor units 110 via the network 125. In alternate embodiments, the local computing device 115, 120, and the remote computing device 140 may be custom computing entities configured to interact with the one or more sensors units 110 via the server 135. In further embodiments, the local computing device 115, 120, and the remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, an ANDROID® device, a smartphone, a mobile phone, a personal digital assistant (PDA), a smart watch, a wearable electronic device, and/or any other suitable device operable to transmit and receive signals, store and retrieve data, and/or execute modules. In some examples, the local computing device 115, 120 may include an alert component, such as a speaker unit, visual display unit, and/or haptic alert unit configured to communicate a location of a user, for example, by an audio and/or visual message.

The control panel 130 may be a smart home system panel such as, for example, an interactive panel mounted on a wall in a user's home. Control panel 130 may be in direct communication via wired or wireless communication links 145 with the one or more sensor units 110, or may receive sensor data from the one or more sensor units 110 via local computing devices 115, 120 and network 125, or may receive data via remote computing device 140, server 135, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth.

In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from the one or more sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the one or more sensor units 110. The remote computing device 140 may be functionally and/or structurally similar to the local computing devices 115, 120 and may be operable to receive data streams from and/or send signals to at least one of the one or more sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and/or the server 135.

In some embodiments, the one or more sensor units 110 may be sensors configured to conduct periodic or ongoing automatic functions (e.g., identifications, determinations, measurements, etc.) associated with a monitored user. In some examples, at least one of the one or more sensor units 110 may be a freestanding video monitoring device, or may be a video monitoring component of the home security and/or automation system 100. Each sensor unit 110 may be capable of sensing one or more physiological, audio, video, environmental, wireless signal, and/or motion parameters (among other things) associated with the monitored user, or alternatively, separate sensor units 110 may monitor separate parameters associated with the user. For example, one sensor unit 110 may measure audio, for example by detecting the sound of the monitored user opening a door or otherwise entering the home, and/or the like, while another sensor unit 110 (or, in some embodiments, a different element of the same sensor unit 110) may be a video monitor configured to record entrance or movement of users or visitors in the home. In some embodiments, one or more sensor units 110 may additionally monitor alternative parameters associated with the monitored \ user, such as motion, vibration, audio, wireless signals emitted by devices associated with the user, and the like. In still other embodiments, sensor units 110 may be configured to detect facial data associated with the monitored user in order to identify the user.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or a smartphone, among other things. The local computing device 115, 120 may process the data received from the one or more sensor units 110 to identify identities of one or more users associated with the home automation and/or security system. In some embodiments, remote computing device 140 may process the data received from the one or more sensor units 110, via network 125 and server 135, to identify a location of one or more users. Data transmission may occur via, for example, frequencies appropriate for a personal area network (such as BLUETOOTH® or Infrared (IR) communications) or local or wide area network frequencies such as radio frequencies specified by the IEEE 802.15.4 standard, among others.

In some embodiments, the local computing device 115, 120 may communicate with remote computing device 140 or control panel 130 via network 125 and server 135. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 135 may be configured to communicate with the one or more sensor units 110, the local computing devices 115, 120, the remote computing device 140, and the control panel 130. The server 135 may perform additional processing on signals received from the one or more sensor units 110 or local computing devices 115, 120, or may simply forward the received information to the remote computing device 140 and control panel 130.

Server 135 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 135 may receive a stream of video data (among other data types) from a sensor unit 110, a stream of occupancy data from the same or a different sensor unit 110, and a stream of facial data (among other data types) from either the same or yet another sensor unit 110.

In some embodiments, server 135 may "pull" the data streams, e.g., by querying the sensor units 110, the local computing devices 115, 120, and/or the control panel 130. In some embodiments, the data streams may be "pushed" from the sensor units 110 and/or the local computing devices 115, 120 to the server 135. For example, the sensor units 110 and/or the local computing device 115, 120 may be configured to transmit data as it is generated by or entered into that device. In some embodiments, the sensor units 110 and/or the local computing devices 115, 120 may periodically transmit data (e.g., as a block of data or as one or more data points). In further embodiments, the server 135 may be a geolocation server that provides geolocation services for identifying and determining a location of a device associated with a user. The geolocation server (e.g., server 135) may determine a location of a device associated with a user by comparing a public Internet IP address of the device with known locations of neighboring servers. The geolocation server may be local or remote to the devices (e.g., local computing device 115, 120, and remote computing device 140).

In some embodiments, the server 135 may include a database (e.g., in memory) containing audio, video, physiological, occupancy data, identity data, schedule data, profile, medical, past monitoring action(s), and/or other data received from the sensor units 110 and/or the local computing devices 115, 120, among other components. Additionally, as described in further detail herein, software (e.g., stored in memory) may be executed on a processor of the server 135. Such software (executed on the processor) may be operable to cause the server 135 to monitor, process, summarize, present, and/or send a signal associated with the monitored occupancy data.

Figure 2:
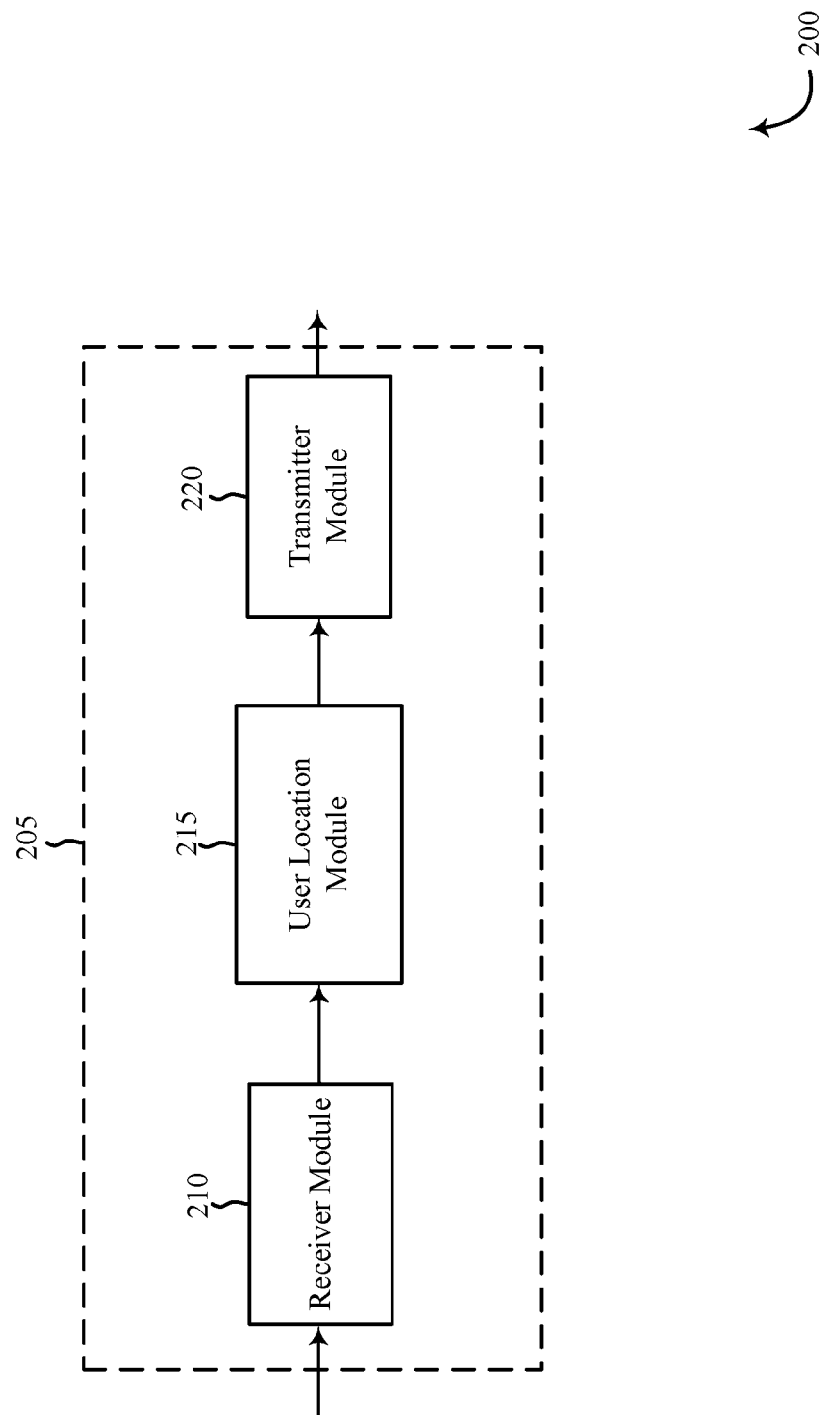
FIG. 2 shows a block diagram of a device relating to a home security and/or automation system, in accordance with various aspects of this disclosure.

FIG. 2 shows a block diagram 200 of an apparatus 205 relating to a home security and/or automation system in accordance with various aspects of the present disclosure. Apparatus 205 may be an example of one or more aspects of a control panel 130 as described with reference to FIG. 1, or may be an example of any of the one or more sensor units 110, the local computing device 115, 120, and/or the remote computing device 140 as described with reference to FIG. 1.

The components of apparatus 205 may, individual or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, identity data, schedule data, or control information associated with various information channels (e.g., control channels, data channels, and information related to tracking and determining a location of a child, etc.). Information may be passed on to other components of the apparatus 205. The receiver module 210 may be an example of aspects of the transceiver 425 described with reference to FIG. 4.

The user location module 215 may determine a location of the one or more second users based at least in part on one or more location parameters. For instance, a parent in a home may want to track and acquire location information inside and/or outside of the home for one or more children. The parent may send a request to the user location module 215, using his device or a control panel associated with the home security and/or automation system. The request may include an instruction from the parent to determine the locations of the one or more children. A device that the parent may use to send the request may be representative of the local computing device 115, 120, remote computing device 140, and/or the control panel 130. In some embodiments, the one or more location parameters may include sensor data received from one or more sensors located within and outside the home, a geo-fence perimeter associated with the home security and/or automation system, schedule data associated with the one or more children, and a location received from the child's mobile device or other GPS tracking device worn or carried by the child.

In one embodiment, the user location module 215 may receive sensor data from one or more sensors associated with the home security and/or automation system via receiver module 210. The sensor data may be received from sensors such as, but not limited to, one or more sensors associated with the sensor unit 110. In some embodiments, a first set of the sensors may be located within a home (e.g., living room, kitchen, children's rooms) and a second set of sensors may be located outside the home (e.g., located in the front yard, backyard, etc.). In one embodiment, the user location module 215 may receive sensor data associated with the first set and the second set from the receiver module 210. In some embodiments, the user location module 215 may determine a location of the one or more children based on the received sensor data from the one or more sensor units 110.

The user location module 215, in some embodiments, may receive occupancy data from one or more sensors associated with the home security and/or automation system via receiver module 210. The occupancy data may be indicative of a location of the one or more children based at least in part on a location associated with the one or more sensors. For example, a first set of sensors may determine motion, noise, heat, etc., within a child's room based on sensor data associated with the one or more sensors in the child's room, while one or more sensors located outside of the home may determine no motion, etc.

In alternate embodiments, the user location module 215 may receive occupancy data associated with a set of sensors outside the home via receiver module 210. For example, one or more sensors located outside the home may determine motion, vibration, noise, heat, etc., based on sensor data collected from one or more sensors located in a backyard and/or front yard of the home. In some embodiments, the user location module 215 may identify a location of one or more children based on the occupancy data, as discussed above. In further embodiments, the user location module 215 may perform further processes to identify an identity of a user associated with the occupancy data as discussed elsewhere herein.

In one embodiment, the user location module 215 may receive an empty set of sensor data from one or more sensors located within and/or outside a home via receiver module 210. An empty set of sensor data may be indicative that no change in a predefined value associated with one or more sensors such as, but not limited to, motion, noise, heat, vibration, was detected within and/or outside the home. This empty set of sensor data may therefore indicate that the home is not occupied.

In some embodiments, the user location module 215 may receive data indicating a change in occupancy data associated with the home security and/or automation system via receiver module 210. A change in occupancy data may be indicative that a particular room within the home and/or an area outside of the home detected one or more children. For instance, the user location module 215 may receive occupancy data that may indicate that no children have been detected within or outside the home during a first duration (e.g., 5 minutes before the received request) but one or more children have been detected within or outside the home during a second duration (e.g., 10 minutes before the received request). In some embodiments, the user location module 215 may communicate a message to the parent indicating a location of the one or more children via transmitter module 220 based at least in part on the occupancy data associated with the first duration and/or the second duration. For instance, the message may be a verbal message such as, "It looks like you're the only one in the house, but someone went out the backdoor 15 minutes ago. Maybe Jill is playing outside?"

In some embodiments, the user location module 215 may analyze schedule data associated with the one or more children. For instance, the user location module 215 may analyze schedule data after determining that no children are within the home and/or outside the home based at least in part on the occupancy data received, from the one or more sensors of the sensor units 110, via receiver 210. In one embodiment, the home security and/or automation system may receive schedule data associated with each user from each user's device (e.g., local computing device 115, 120) directly by pulling schedule data from the device routinely (e.g., daily, weekly, monthly, etc.). In some embodiments, the user location module 215 may receive schedule data from each user via the control panel 130 associated with the home security and/or automation system. For instance, the control panel 130 may have an application such as, but not limited to, a calendar application that stores each child's schedule. In one embodiment, for example, each child may input at the control panel 130 his schedule. In alternate embodiments, the calendar application may be stored on a device (e.g., local computing device 115, 120) associated with each user, and the schedule data may be uploaded to the home security and/or automation system from the device via the server 135 or network 125.

In some embodiments, the user location module 215 may analyze information in the schedule data associated with each user to determine a location of the one or more users. For instance, a parent may request to know the location of his child, by sending a request to the home security and/or automation system via network 125. The user location module 215 may retrieve the schedule data from a database and/or memory associated with local computing device 115, 120, control panel 130, and/or remote computing device 140, and analyze information associated with the schedule data to determine the location of the child. Information in the schedule data may indicate, for example, that the child is meeting with a tutor at his high school. The user location module 215 may communicate a message to the parent's device via network 125. For instance, the message may be an SMS message to the parent's mobile phone indicating that "Tom is meeting with his tutor at his high school."

In one embodiment, the user location module 215 may determine a location of one or more children based on information received from a mobile device associated with the one or more children. A mobile device may include, but is not limited to, a GPS wearable device (e.g., smart watch). For instance, a parent may want to be alerted when the home security and/or automation system determines that his child leaves the house. In one embodiment, the home security and/or automation system may determine that the child leaves his house based at least in part on a geo-fence perimeter. The geo-fence perimeter may be associated with a predetermined area, for example, a perimeter around a house, a perimeter around a neighborhood, etc. In some embodiments, the user location module 215 may transmit a request for a location to the mobile device (e.g., GPS wearable device) associated with the one or more children. The user location module 215 may receive the location of the mobile device via network 125 and determine that the child is within and/or outside the geo-fence perimeter based on the received information (i.e., location). In some embodiments, determining that the child is outside the geo-fence perimeter may prompt the user location module 215 to communicate a message to the parent indicating that the location associated with the one or more children is outside the geo-fence perimeter. The user location module 215 may also be an example of aspects of the user location module 215-*a* described with reference to FIG. 3.

The transmitter module 220 may transmit one or more signals received from other components of the apparatus 205. The transmitter module 220 may transmit data received from the receiver module 210 directly to the control panel 130 and/or individual components of the home security and/or automation system without further processing by the user location module. In some embodiments, the transmitter module 220 may be collocated with a receiver in a transceiver module. For example, the transmitter module 220 may be an example of aspects of the transceiver 425 described with reference to FIG. 4. The transmitter module 220 may include a single antenna, or it may include a plurality of antennas.

Figure 3:
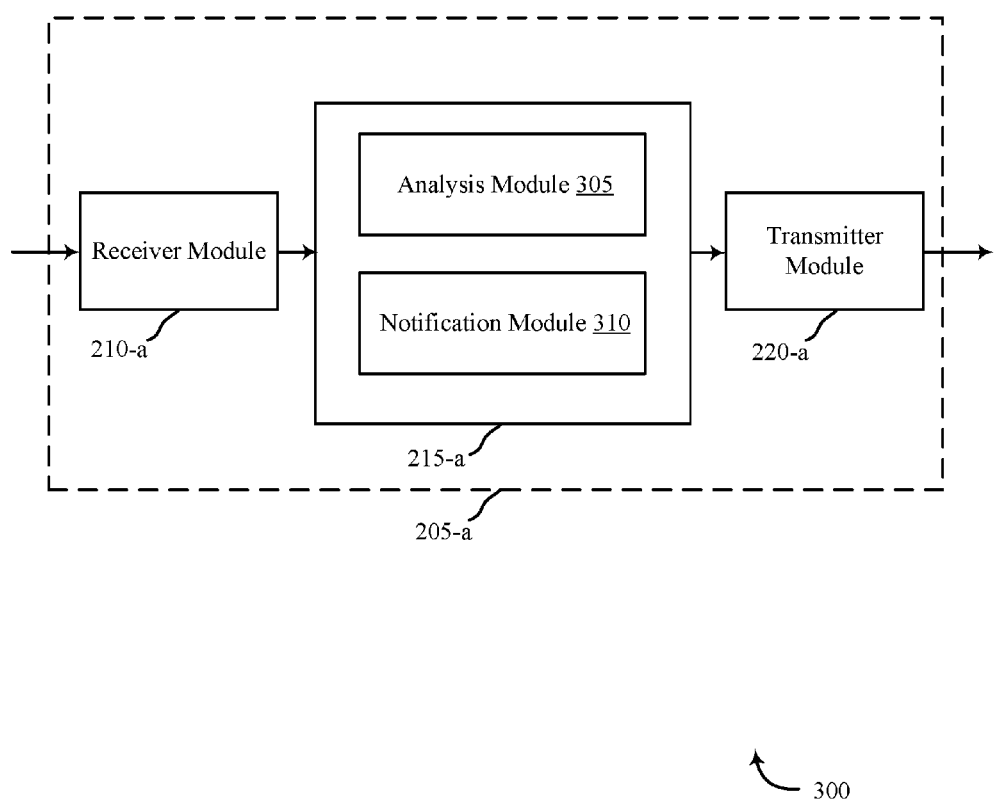
FIG. 3 shows a block diagram of a device relating to a home security and/or automation system, in accordance with various aspects of this disclosure.

FIG. 3 shows a block diagram 300 of an apparatus 205-*a* relating to a home security and/or automation system, in accordance with various aspects of this disclosure. Apparatus 205-*a* may be an example of aspects of an apparatus 205 or a control panel 130 described with reference to FIGS. 1 and 2. Apparatus 205-*a* may include a receiver module 210-*a*, a user location module 215-*a*, and a transmitter module 220-*a*, which may be examples of receiver module 210, user location module 215, and transmitter module 220 described with respect to FIG. 2. Apparatus 205-*a* may also include a processor and memory. Each of these components may be in communication with each other.

The components of the apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210-a may receive information such as packets, occupancy data, sensory data, schedule data, and/or control information associated with various information channels (e.g., control channels, data channels, etc.). In some embodiments, where the receiver module 210-a is an example of one or more aspects of the one or more sensor units 110 of FIG. 1, the receiver module 210-a may be configured to detect any of audio, video, light, physiological (including heart rate, respiration rate, posture, sleep status, identity, etc.), and/or movement (including occupancy and location) data (among other things) associated with the monitored user(s). In other embodiments, where the receiver module 210-a is an example of one or more aspects of the local computing device 115, 120, control panel 130, or remote computing device 140, the receiver module 210-a may be configured to receive any of audio, video, light, physiological (including heart rate, respiration rate, posture, sleep status, identity, etc.), and/or movement (including occupancy and location) data (among other things) associated with the monitored user(s), where such data is detected by one or more sensor units positioned near the monitored user(s).

Additionally or alternatively, where the receiver module 210-a is an example of one or more aspects of a local computing device 115, 120, control panel 130, or remote computing device 140, receiver module 210-a may receive a request for a location of one or more children. In some embodiments, the receiver module 210-a may receive a request from a parent in a home to acquire respective locations for his one or more children. The receiver module 210-a may communicate with a device that recognizes user input (e.g., user inputted or spoken commands via control panel 130, local computing device 115, 120, and/or remote computing device 140) and initiates operations relating to the home security and/or automation system for tracking a location of a child. For instance, in some embodiments, a parent may input a request at a control panel 130 associated with the home security and automation system for tracking the location of the child. In other examples, the parent may transmit a request using an application on a device such as, but not limited to, the local computing device 115, 120 and/or the remote computing device 140 that communicates directly with the control panel 130 and/or one or more other devices of the home security and automation system. Once the parent transmits a request to track the location of their child, the receiver module 210-a may transmit the request to the user location module 215-a to perform one of several operations, as described elsewhere herein.

In some embodiments, the receiver module 210-a may receive sensor data from one or more sensors associated with the home security and/or automation system. For instance, the receiver module 210-a may receive sensor data from the one or more sensor units 110. In some embodiments, the sensor data may include, but is not limited to, occupancy data. The occupancy data may be indicative of a location of one or more users. In one embodiment, occupancy data may be determined based at least in part on motion and/or noise data determined by the one or more sensor units 110. In some embodiments, the occupancy data may be indicative that a child is potentially located within a proximity of the sensors that determined the motion and noise, however a definite identity may not yet be established. The receiver module 210-a may communicate the sensor data and/or occupancy data to the user location module 215-a to perform one of several operations, as described elsewhere herein.

In some embodiments, the receiver module 210-a may receive schedule data associated with one or more users. In one embodiment, the receiver module 210-a may receive schedule data from each device (e.g., local computing device 115, 120) associated with the one or more users by directly pulling schedule data from the device routinely (e.g., daily, weekly, monthly, etc.). In alternate embodiments, the receiver module 210-a may receive schedule data from each of the one or more users via the control panel 130 associated with the home security and/or automation system. In other embodiments, the receiver module 210-a may retrieve schedule data associated with one or more users from a database associated with the home security and/or automation system.

In some embodiments, the receiver module 210-a may receive a location from a mobile device of the one or more users. A mobile device may include, but is not limited to, a GPS wearable device (e.g., smart watch), a smartphone, a personal computing device, or the like. For instance, a GPS smart watch worn by a child may transmit the location of the watch to a server (e.g., server 135), and the server may communicate the location of the GPS smart watch to the receiver module 210-a. The receiver module 210-a may communicate the received location to the user location module 215-a to perform one of several operations, as described elsewhere herein.

The user location module 215-a may include an analysis module 305. In some embodiments, the analysis module 305 may analyze one or more location parameters. In one embodiment, the user location module 215-a may communicate with a security system and/or another automation device (e.g., sensors 110) within the home for determining a location of one or more users. The analysis module 305 may receive from the receiver module 210-a one or more location parameters associated with the home security and/or automation system.

In some embodiments, the analysis module 305 may receive one or more location parameters from the receiver module 210-a. The analysis module 305 may analyze the one or more location parameters for determining a location of one or more users. For instance, the analysis module 305 may analyze one or more location parameters associated with the home security and automation system for determining the location of one or more children. The one or more location parameters may include, but are not limited to, sensor data received from one or more sensors and a geo-fence perimeter associated with the home security and/or automation system, schedule data associated with the one or more children, and a location received from the child's mobile device or other tracking device worn or carried by the child.

In one embodiment, the analysis module 305 may receive sensor data from one or more sensors associated with the home security and/or automation system via receiver module 210-a. The sensor data may be received from sensors such as, but not limited to, one or more sensors associated with the sensor unit 110. In some embodiments, a first set of the sensors may be located within a home (e.g., living room, kitchen, children's rooms) and a second set of sensors may be located outside the home (e.g., located in the front yard, backyard, etc.). The analysis module 305 may analyze the sensor data to determine that one or more users are detected within the home and/or outside the home. The analysis module 305 may communicate the detected one or more users to the notification module 310 to communicate a message to the user associated with the request (e.g., parent) indicating the location of the one or more users via transmitter module 220-*a*.

In further embodiments, the analysis module 305 may receive occupancy data from the one or more sensors associated with the one or more sensors units 110. For instance, the receiver module 210-*a* may receive occupancy data from one or more sensor units 110 and communicate the occupancy data to the analysis module 305. In some embodiments, the one or more sensors may include, but are not limited to, motion sensors, audio sensors, temperature sensors, light sensors, contact sensors, etc. For instance, the analysis module 305 may determine occupancy associated with potentially one or more users based at least in part on motion and noise data associated with the motion sensors and audio sensors.

In one embodiment, the analysis module 305 may initially determine a location of a user within a home based at least in part on the occupancy data. In some embodiments, the analysis module 305 may analyze the occupancy data and filter the occupancy data based at least in part on one or more criteria. A criteria may include, for example, filtering out occupancy data related to a particular area within and/or outside the home associated with a request of a user (e.g., parent). For instance, the analysis module 305 may filter occupancy data related to a room from which a parent transmitted a request to acquire a respective location of one or more children. This may result in power saving and efficiency in processing associated with determining locations of the one or more users, and may avoid false positives resulting from identifying the parent as an occupant.

In some cases, the analysis module 305 may receive and collect identity data from the one or more sensors units 110. In some embodiments, the analysis module 305 may collect and store identity data in a memory of the apparatus 205-*a*, a database associated with the server 135, in a memory of the local computing device 115, 120, and/or the remote computing device 140. The analysis module 305 may, in one embodiment, compare the collected identity data to one or more identities from an identity database associated with the home security and automation system. In some embodiments, the analysis module 305 may identify one or more users (e.g., children) based at least in part on the comparing.

In one embodiment, the analysis module 305 may apply a facial recognition algorithm to identity data received from the one or more sensors from the one or more sensor units 110 to determine an identity of one or more children. For instance, identity data may be associated with one or more cameras within and/or outside a home that capture data frames when motion is detected. The analysis module 305 may then apply a facial recognition algorithm to the data frames to compile identity data of a user (e.g., child). In some cases, the analysis module 305 may parse one or more stored identities in a database associated with the home security and automation system, and compare the identity data to the one or more stored identities for a match. For instance, the analysis module 305 may determine the identity data is a match for the child. If a match exists, the analysis module 305 may determine a location based on the location of the camera associated with the data frame used for compiling the identity data.

In some embodiments, the analysis module 305 may analyze schedule data associated with one or more users. In one embodiment, the analysis module 305 may receive schedule data from the receiver module 210-*a*. In some embodiments, the analysis module 305 may receive schedule data from the control panel 130 via receiver module 210-*a*. The control panel 130 may include an application such as, but not limited to, a calendar application that stores each child's schedule. In one embodiment, each user (e.g., child) may input at the control panel 130 his schedule. In alternate embodiments, the calendar application may be stored on a device (e.g., local computing device 115, 120) associated with each user or on a network, and the schedule data may be uploaded to the analysis module 305 from the device via the server 135 or network 125.

In some embodiments, the analysis module 305 may analyze information in the schedule data associated with each user to determine a location of the one or more users. For instance, a parent may request to know the location of his child, by sending a request to the home security and/or automation system. The receiver module 210-*a* may receive the request and notify the analysis module 305. The analysis module 305 may retrieve the schedule data from a database and analyze information associated with the schedule data for information related to determining a location of the one or more users. For instance, schedule data may include, but is not limited to, appointments within a predefined time (e.g., any appoints during 7 am-5 pm). An appointment associated with the schedule data, for example, may indicate that the user is at his neighborhood pool party. The analysis module 305 may transmit the information (i.e., schedule data, schedule information) to the notification module 310 for further processing.

In some embodiments, the analysis module 305 may determine that a user may be late to an event based at least in part on the schedule data and the location of the user. The analysis module 305, in one embodiment, may communicate a message to the notification module 310. The notification module 310 may communicate the message to a device (e.g., local computing device 115, 120, control panel 130, and/or remote computing device 140) associated with the user (e.g., parent) indicating that the one or more second users may be late to an event. For instance, a parent requesting a location of a child may be notified via an audio or visual message that, based on the location of the child and the schedule data associated with the child, the child may be late to soccer practice. For example, the audio message may be that "Lilly is in the living room. Lilly has cheer practice at 3:00 pm today. Lilly is going to be late to cheer practice."

The analysis module 305, in some embodiments, may determine that one or more children are outside a geo-fence perimeter based at least in part on analyzed one or more location parameters. The analysis module 305 may determine and track a location of one or more users that are determined to be outside of a home based at least in part on the geo-fence designated by a user associated with the home security and/or automation system. In some embodiments, the analysis module 305 may analyze a location received from a mobile device of one or more users. For example, the analysis module 305 may analyze the received location from the wearable GPS device to determine whether the user is outside a geo-fence perimeter. In one embodiment, the GPS wearable device (e.g., remote device 140) may communicate a location during a predefined period (e.g., hourly) to the server 135. The server 135 may transmit an update of the location to the analysis module 305 based at least in part on the predefined period.

In some embodiments, the analysis module may compare a predicted location of the one or more users based at least in part on the schedule information to the received location from the mobile device (e.g., GPS wearable device). A predicted location may be a location corresponding to a place of an event associated with the schedule information. For instance, the schedule information may indicate that a child is attending a concert at a venue. In some embodiments, the analysis module 305 may detect that the location received from the mobile devices associated with the one or more users is different from the predicted location derived from the received schedule information associated with each user and/or that the received location is outside the geo-fence perimeter. For instance, the analysis module 305 may detect that one or more children should be at soccer practice at his school based on the schedule information, but the location received from the mobile device may indicate that the one or more children are at different location (outside the geo-fence perimeter) (e.g., movie theater, mall, etc.). The analysis module 305 may alert the notification module 310 to communicate a message to the parent indicating a difference between the location of the mobile device associated with the one or more children and the predicted location derived from the received schedule information.

In one embodiment, the analysis module 305 may track a location of the one or more users based at least in part on feedback from a user associated with the request (e.g., parent). For instance, feedback may include, but is not limited to, a parent requesting an update on the location of the one or more children during a predetermined time interval from the mobile device associated with the one or more children. A predetermined time interval may include, but is not limited to, an update every minute, 30 minutes, hour, etc. In some embodiments, the notification module 310 may stop communicating an updated message after the analysis module 305 determines that one or more children are within a geo-fence perimeter.

In some embodiments, the user location module 215-a may include a notification module 310. In some embodiments, the notification module 310 may receive a location associated with one or more children. The notification module 310 may communicate a message to a user (e.g., parent) via the transmitter module 220-a, indicating the location of the user (e.g., one or more children) within or outside the home. In alternate embodiments, the notification module 310 may communicate the predicted location of the one or more users to the user associated with the request (e.g., parent). In some embodiments, the notification module 310 in conjunction with the transmitter module 220-a, may communicate a message (e.g., email, SMS, etc.) to a device of the requesting user indicating the predicted location of the one or more users. The notification module 310, in alternate embodiments, may transmit a message via transmitter module 220-a to display a visual message on the control panel 130.

Figure 4:
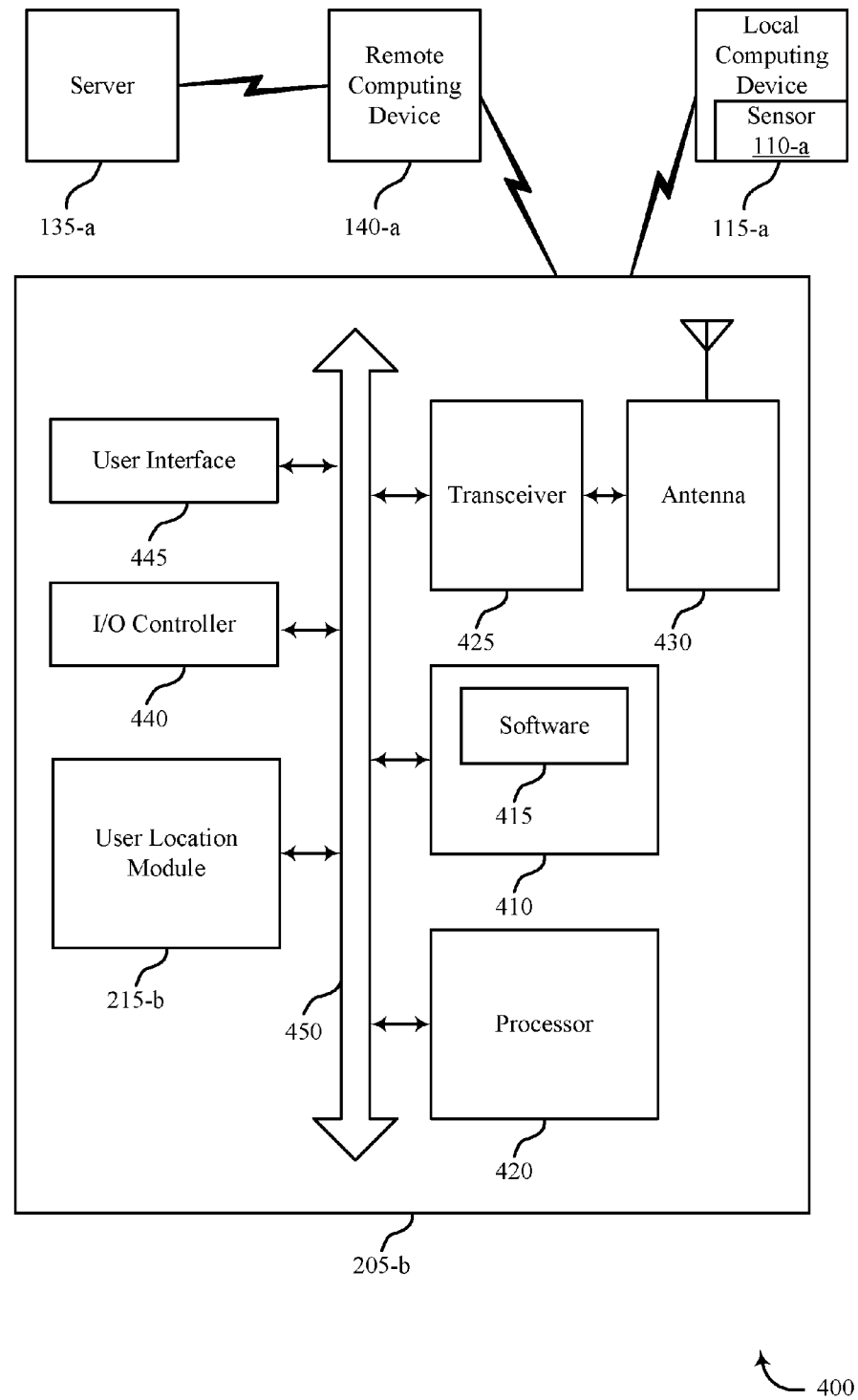
FIG. 4 shows a block diagram relating to a home security and/or automation system, in accordance with various aspects of this disclosure.

FIG. 4 shows a block diagram relating to a home security and/or automation system 400, in accordance with various aspects of this disclosure. For example, system 400 may include apparatus 205-b, which may be an example of an apparatus 205, 205-a as described with reference to FIGS. 2 and 3. In some embodiments, one or more sensors 110-a (e.g., motion, proximity, smoke, light, glass break, door, window, carbon monoxide, and/or another sensor) may connect to some element of system 400 via a network using one or more wired and/or wireless connections. One or more buses 450 may allow data communication between one or more elements of apparatus 205-b.

Many other devices and/or subsystems may also be connected to or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and is not discussed in detail in this application. Code to implement the present disclosure may be stored in a non-transitory computer-readable medium such as system memory. The operating system for apparatus 205 or for other devices within system 400 may be iOS, ANDROID, MS-DOS, MS-WINDOWS, OS/2, UNIX, LINUX, or another known operating system.

Apparatus 205-b may also include user location module 215-b, memory 410, processor 420, transceiver 425, and antenna 430. Each of these modules may communicate, directly or indirectly, with one another (e.g., via one or more buses 450). In some embodiments, the terms "control panel" and "control device" are used synonymously.

The user location module 215-b may be an example of a user location module as described with reference to FIGS. 2 and 3. In some cases user location module 215-b may be represented as a software module.

The memory 410 may include random access memory (RAM) and read only memory (ROM). The memory 410 may store computer-readable, computer-executable software including instructions that, when executed, cause the processor to perform various functions described herein (e.g., communicating a message indicating a location of a child, etc.). In some embodiments, the memory 410 can contain, among other things, the Basic Input-Output system (BIOS) which may control basic hardware and/or software operation such as the interaction with peripheral components or devices. For example, software modules to implement the present systems and methods may be stored within the system memory 410. In some cases, applications in memory 410 stored on and accessed via a non-transitory computer readable medium, such as a hard disk drive or other storage medium. Additionally, applications can be in the form of electronic signals modulated in accordance with the application and data communication technology when accessed via a network interface.

In some cases, the software 415 may not be directly executable by the processor but may cause a computer (e.g., when compiled and executed) to perform functions described herein. The processor 420 may include an intelligent hardware device, (e.g., a central processing unit (CPU), a microcontroller, an application specific integrated circuit (ASIC), etc.).

The transceiver 425 may communicate bi-directionally, via one or more antennas, wired, or wireless links, with one or more networks, as described above. For example, the transceiver 425 may communicate bi-directionally with one or more local computing device 115-a, one or more sensors 110-a, remote computing device 140-a, and/or server 135-a, which may be an example of the server of FIG. 1. This bidirectional communication may be direct (e.g., apparatus 205-b communicating directly with remote computing device 140-a) or indirect (e.g., apparatus 205-b communicating indirectly with server 135-a through remote computing device 140-a). The transceiver 425 may also include a modem to modulate the packets and provide the modulated packets to the antennas for transmission, and to demodulate packets received from the antennas.

In some embodiments, an element of apparatus 205-*b* (e.g., transceiver 425) may provide a direct connection to a server 135-*a* via a direct network link to the Internet via a POP (point of presence). In some embodiments, one element of 205-*b* may provide a connection using wireless techniques, including digital cellular telephone connection, Cellular Digital Packet Data (CDPD) connection, digital satellite data connection, and/or another connection.

The signals associated with transceiver 425 may include wireless communication signals such as radio frequency, electromagnetics, local area network (LAN), wide area network (WAN), virtual private network (VPN), wireless network (using 802.11, for example), 345 MHz, Z-WAVE, cellular network (using 3G and/or LTE, for example), and/or other signals. The one or more antennas 430 and/or transceiver 425 may include or be related to, but are not limited to, WWAN (GSM, CDMA, and WCDMA), WLAN (including BLUETOOTH and Wi-Fi), WMAN (WiMAX), antennas for mobile communications, antennas for Wireless Personal Area Network (WPAN) applications (including RFID and UWB).

In some cases, the control device may include one or more antenna 430, which may be capable of concurrently transmitting or receiving multiple transmissions. In some embodiments, each antenna 430 may receive signals or information specific and/or exclusive to itself. In other embodiments, each antenna 430 may receive signals or information not specific or exclusive to itself.

Figure 5:
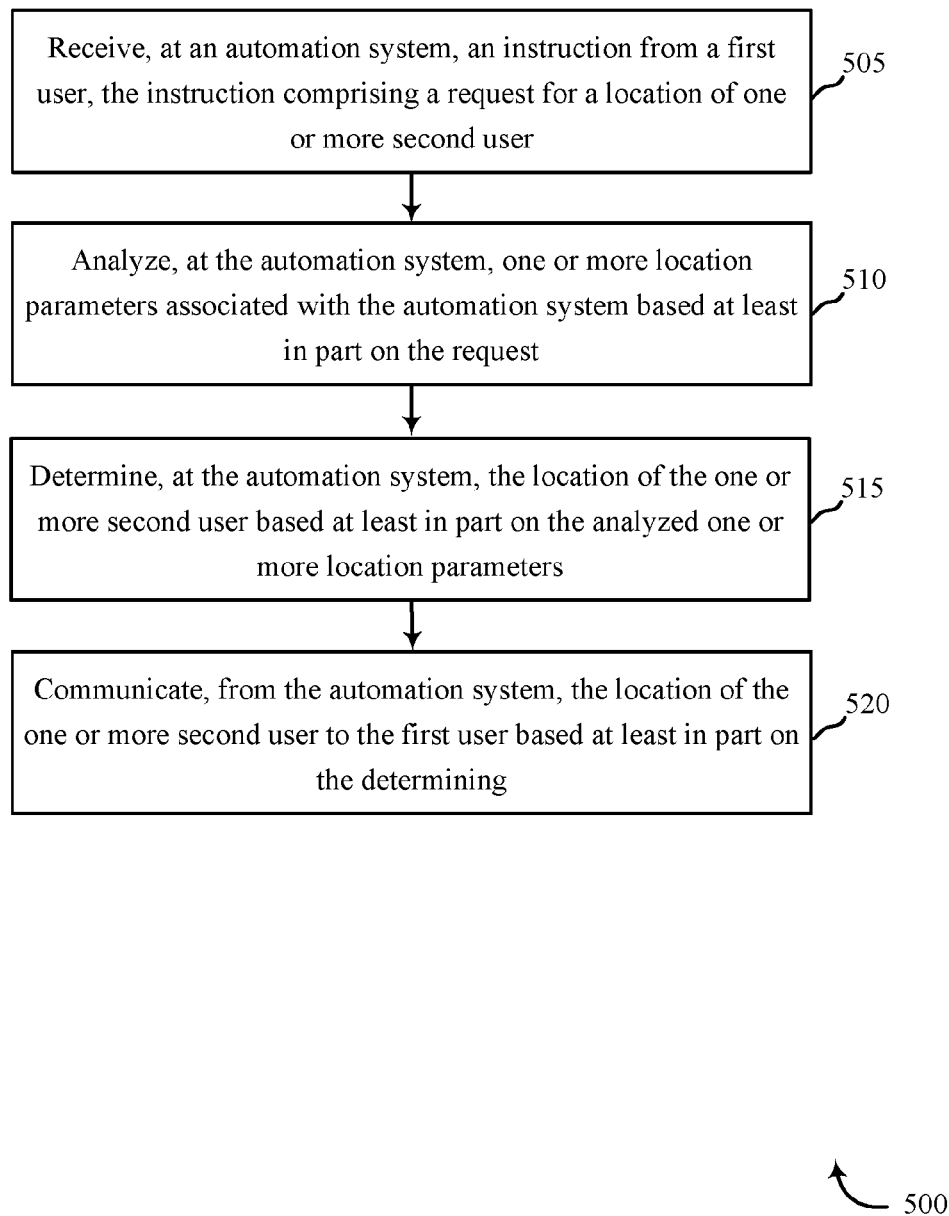
FIG. 5 is a flowchart illustrating an example of a method relating to a home security and/or automation system, in accordance with various aspects of this disclosure.

FIG. 5 is a flowchart illustrating an example of a method 500 relating to a home security and/or automation system, in accordance with various aspects of this disclosure. The operations of method 500 may be implemented by a device such as an apparatus 205, 205-*a*, 205-*b*, or its components, as described with reference to FIGS. 2-4. In some examples, the apparatus 205, 205-*a*, 205-*b* may execute a set of codes to control the functional elements of the device to perform the functions described below. Additionally or alternatively, the apparatus 205, 205-*a*, 205-*b* may perform aspects the functions described below using special-purpose hardware. It should be noted that the method 500 is just one implementation and that the operations of the method 500 may be rearranged or otherwise modified such that other implementations are possible.

At block 505, the apparatus 205, 205-*a*, 205-*b* may receive an instruction from a first user as described above with reference to FIGS. 2-4. In some cases, the instruction may include a request for a location of one or more second users. In certain examples, the operations of block 505 may be performed by the receiver module 210, 210-*a* as described with reference to FIGS. 2 and 3.

At block 510, the apparatus 205, 205-*a*, 205-*b* may analyze one or more location parameters associated with an automation system based at least in part on the request as described above with reference to FIGS. 2-4. In certain examples, the operations of block 510 may be performed by analysis module 305 as described with reference to FIGS. 2 and 3.

At block 515, the apparatus 205, 205-*a*, 205-*b* may determine the location of the one or more second users based at least in part on the analyzed one or more location parameters as described above with reference to FIGS. 2-4. In certain examples, the operations of block 515 may be performed by the analysis module 305 as described with reference to FIGS. 2 and 3.

At block 520, the apparatus 205, 205-*a*, 205-*b* may communicate the location of the one or more second users to the first user based at least in part on the determining as described above with reference to FIGS. 2-4. In certain examples, the operations of block 520 may be performed by the notification module 310 in conjunction with the transmitter module 220-*a* as described with reference to FIGS. 2 and 3.

Figure 6:
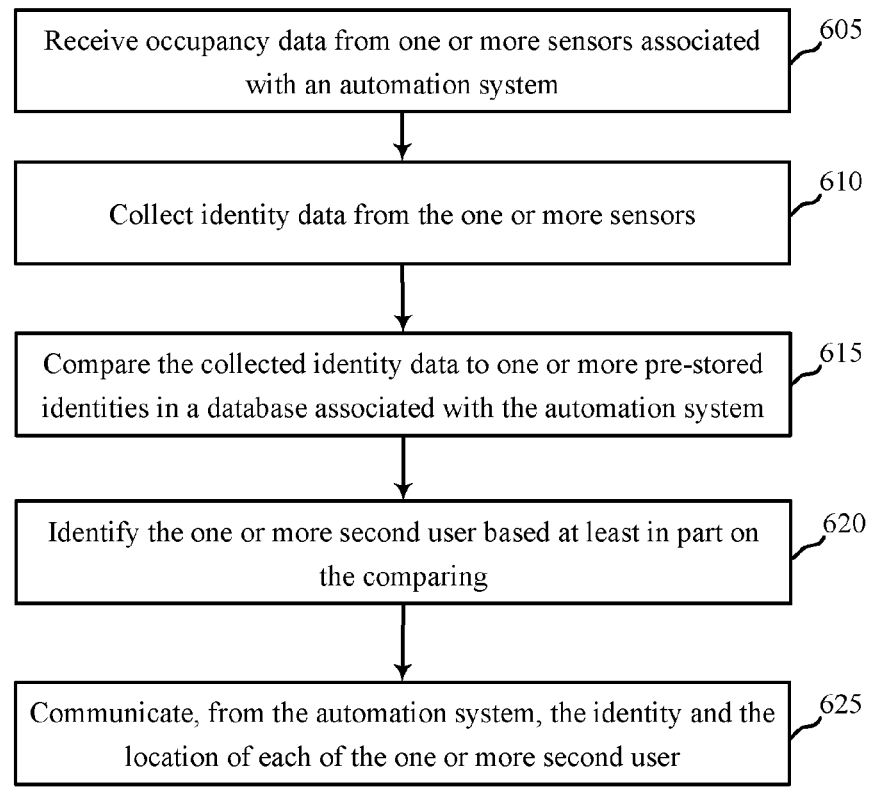
FIG. 6 is a flowchart illustrating an example of a method relating to a home security and/or automation system, in accordance with various aspects of this disclosure.

FIG. 6 is a flowchart illustrating an example of a method 600 relating to a home security and/or automation system, in accordance with various aspects of this disclosure. The operations of method 600 may be implemented by a device such as an apparatus 205, 205-*a*, 205-*b*, or its components, as described with reference to FIGS. 2-4. In some examples, the apparatus 205, 205-*a*, 205-*b* may execute a set of codes to control the functional elements of the device to perform the functions described below. Additionally or alternatively, the apparatus 205, 205-*a*, 205-*b* may perform aspects the functions described below using special-purpose hardware. It should be noted that the method 600 is just one implementation and that the operations of the method 600 may be rearranged or otherwise modified such that other implementations are possible.

At block 605, the apparatus 205, 205-*a*, 205-*b* may receive occupancy data from one or more sensors associated with an automation system as described above with reference to FIGS. 2-4. In certain examples, the operations of block 605 may be performed by the receiver module 210-*a* in conjunction with the one or more sensors 110 as described with reference to FIGS. 2 and 3.

At block 610, the apparatus 205, 205-*a*, 205-*b* may collect identity data from the one or more sensors as described above with reference to FIGS. 2-4. In certain examples, the operations of block 610 may be performed by the receiver module 210-*a* in conjunction with the analysis module 305 and the one or more sensors 110 as described with reference to FIGS. 2 and 3.

At block 615, the apparatus 205, 205-*a*, 205-*b* may compare the collected identity data to one or more pre-stored identities in a database associated with the automation system as described above with reference to FIGS. 2-4. In certain examples, the operations of block 615 may be performed by the analysis module 305 as described with reference to FIGS. 2 and 3.

At block 620, the apparatus 205, 205-*a*, 205-*b* may identify the one or more second users based at least in part on the comparing as described above with reference to FIGS. 2-4. In certain examples, the operations of block 620 may be performed by the analysis module 305 as described with reference to FIGS. 2 and 3.

At block 625, the apparatus 205, 205-*a*, 205-*b* may communicate the identity and the location of each of the one or more second users as described above with reference to FIGS. 2-4. In certain examples, the operations of block 625 may be performed by the notification module 310 in conjunction with the transmitter module 220-*a* as described with reference to FIGS. 2 and 3.

Figure 7:
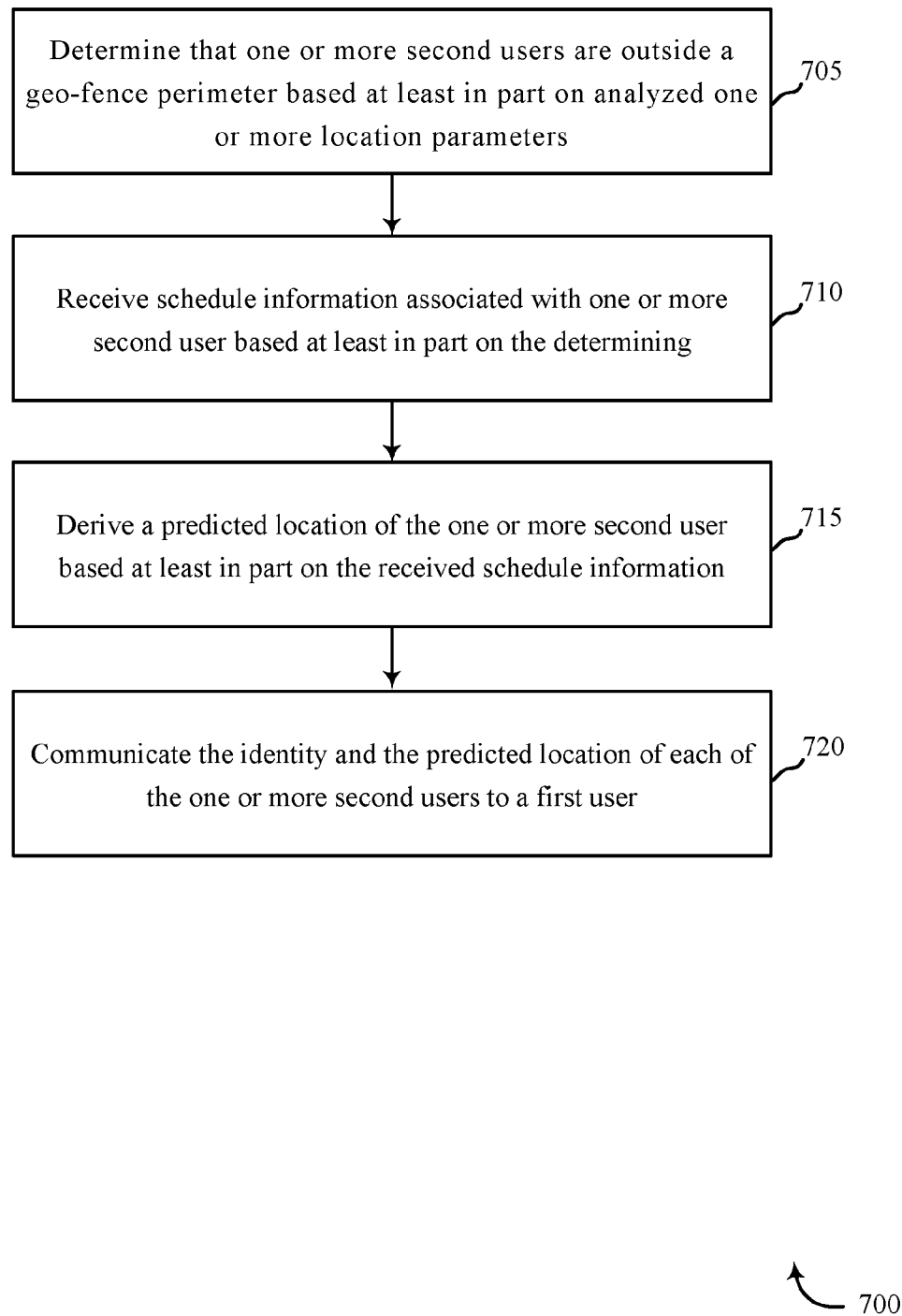
FIG. 7 is a flowchart illustrating an example of a method relating to a home security and/or automation system, in accordance with various aspects of this disclosure.

FIG. 7 is a flowchart illustrating an example of a method 700 relating to a home security and/or automation system, in accordance with various aspects of this disclosure. The operations of method 700 may be implemented by a device such as an apparatus 205, 205-*a*, 205-*b*, or its components, as described with reference to FIGS. 2-4. For example, the operations of method 700 may be performed by the user location module as described herein. In some examples, the apparatus 205, 205-*a*, 205-*b* may execute a set of codes to control the functional elements of the device to perform the functions described below. Additionally or alternatively, the apparatus 205, 205-*a*, 205-*b* may perform aspects the functions described below using special-purpose hardware. It should be noted that the method 700 is just one implementation and that the operations of the method 700 may be rearranged or otherwise modified such that other implementations are possible.

At block 705, the apparatus 205, 205-*a*, 205-*b* may determine that one or more second users are outside a geo-fence perimeter based at least in part on analyzed one or more location parameters as described above with reference to FIGS. 2-4. In certain examples, the operations of block 705 may be performed by the analysis module 305 as described with reference to FIGS. 2 and 3.

At block 710, the apparatus 205, 205-*a*, 205-*b* may receive schedule information associated with one or more second users based at least in part on the determining as described above with reference to FIGS. 2-4. In certain examples, the operations of block 710 may be performed by the receiver module 210-*a* as described with reference to FIGS. 2 and 3.

At block 715, the apparatus 205, 205-*a*, 205-*b* may derive a predicted location of the one or more second users based at least in part on the received schedule information as described above with reference to FIGS. 2-4. In certain examples, the operations of block 715 may be performed by the analysis module 305 as described with reference to FIGS. 2 and 3.

At block 720, the apparatus 205, 205-*a*, 205-*b* may communicate the identity and the predicted location of each of the one or more second users to a first user as described above with reference to FIGS. 2-4. In certain examples, the operations of block 720 may be performed by the notification module 310 in conjunction with the transmitter module 220-*a* as described with reference to FIGS. 2 and 3.

In some examples, aspects from two or more of the methods above may be combined and/or separated. It should be noted that these methods are example implementations, and that the operations may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous" over other examples. The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security/automation systems, comprising:
   receiving, at an automation system, an instruction from a first user, the instruction comprising a request for a location of a second user;
   receiving, at the automation system, from a wearable electronic device carried by the second user a first location associated with the second user;
   deriving, at the automation system, a second location of the second user based at least in part on received schedule data associated with the second user;
   determining, at the automation system, that the first location is different from the second location; and
   communicating, from the automation system, an audio message to the first user indicating a difference between the first location and the second location of the second user to the first user based at least in part on the determining.

2. The method of claim 1, further comprises:
   receiving occupancy data from one or more sensors associated with the automation system.

3. The method of claim 2, further comprising:
   collecting identity data from the one or more sensors;
   comparing the collected identity data to one or more identities from an identity database associated with the automation system;
   identifying the second user based at least in part on the comparing; and
   communicating, from the automation system, an audio message to the first user regarding the identity and the location of the second user.

4. The method of claim 1, further comprises:
   receiving, at the automation system, schedule information associated with the second user;
   deriving a predicted location of the second user based at least in part on the received schedule information; and
   communicating, from the automation system, an audio message to the first user regarding the predicted location of the second user to the first user.

5. The method of claim 4, wherein receiving schedule information associated with the second user comprises:
   determining that the second user is outside a geo-fence perimeter based at least in part on a received location parameter.

6. The method of claim 4, further comprising:
   receiving a location of the second user from a mobile device associated with the second user;
   detecting that the location received from the mobile device associated with the second user is different from the predicted location derived from the received schedule information; and
   communicating an audio message to the first user indicating a difference between the location of the mobile device associated with the second user and the predicted location derived from the received schedule information.

7. The method of claim 6, wherein detecting that the location received from the mobile device associated with the second user is different from the predicted location derived from the received schedule information further comprises:
   tracking the location of the second user based at least in part on requesting an update in the location of the second user during a predetermined time interval from the mobile device associated with the second user; and
   communicating an audio update message to the first user based at least in part on the tracked location of the second user.

8. The method of claim 1, further comprises:
   requesting a location from a mobile device associated with the second user;
   receiving the location from the mobile device associated with the second user; and
   communicating, by way of an audio message, the location associated with the second user to the first user.

9. The method of claim 1, wherein the instruction from the first user is received at a control panel associated with the automation system.

10. An apparatus for security and/or automation systems, comprising:
a processor;
memory in electronic communication with the processor;
instructions stored in the memory, the instructions being executable by the processor to:
receive an instruction from a first user, the instruction comprising a request for a location of a second user;
receive from a wearable electronic device carried by the second user a first location associated with the second user;
derive a second location of the second user based at least in part on received schedule data associated with the second user;
determine that the first location is different from the second location; and
communicate an audio message to the first user indicating a difference between the first location and the second location of the second user to the first user based at least in part on the determining.

11. The apparatus of claim 10, wherein the instructions executable by the processor to:
receive occupancy data from one or more sensors associated with the automation system.

12. The apparatus of claim 11, wherein the instructions are executable by the processor to:
collect identity data from the one or more sensors;
compare the collected identity data to one or more identities from an identity database associated with the automation system;
identify the second user based at least in part on the comparing; and
communicate an audio message regarding the identity and the location of the second user.

13. The apparatus of claim 10, wherein the instructions executable by the processor to analyze one or more location parameters associated with the automation system are further executable by the processor to:
receive schedule information associated with the second user;
derive a predicted location of the second user based at least in part on the received schedule information; and
communicate an audio message the predicted location of the second user to the first user.

14. The apparatus of claim 13, wherein the instructions executable by the processor to receive schedule information associated with the second user are further executable by the processor to:
determine that the second user is outside a geo-fence perimeter based at least in part on the analyzed one or more location parameters.

15. The apparatus of claim 13, wherein the instructions are executable by the processor to:
receive a location of the second user from a mobile device associated with the second user;
detect that the location received from the mobile device associated with the second user is different from the predicted location derived from the received schedule information; and
communicate an audio message to the first user indicating a difference between the location of the mobile device associated with the second user and the predicted location derived from the received schedule information.

16. The apparatus of claim 15, wherein the instructions executable by the processor to detect that the location received from the mobile device associated with the second user is different from the predicted location derived from the received schedule information are further executable by the processor to:
track the location of the second user based at least in part on requesting an update in the location of the second user during a predetermined time interval from the mobile device associated with the second user; and
communicate an audio update message to the first user based at least in part on the tracked location of the second user.

17. The apparatus of claim 10, wherein the instructions are executable by the processor to:
request a location from a mobile device associated with the second user;
receive the location from the mobile device associated with the second user; and
communicate an audio message regarding the location associated with the second user to the first user.

18. The apparatus of claim 10, wherein the instruction from the first user is received at a control panel associated with the automation system.

19. A computer-program product, the computer-program product comprising a non-transitory computer-readable medium storing instructions thereon, the instructions being executable by a processor to:
receive an instruction from a first user, the instruction comprising a request for a location of a second user;
receive from a wearable electronic device carried by the second user a first location associated with the second user;
derive a second location of the second user based at least in part on received schedule data associated with the second user;
determine that the first location is different from the second location; and
communicate an audio message to the first user indicating a difference between the first location and the second location of the second user to the first user based at least in part on the determining.

20. The computer-program product of claim 19, wherein the instructions are executable by the processor to:
receive occupancy data from one or more sensors associated with the automation system;
collect identity data from the second user;
compare the collected identity data to one or more identities from an identity database associated with the automation system;
identify the second user based at least in part on the comparing; and
communicate an audio message related to the identity and the location of the second user.

* * * * *